US007596465B2

United States Patent
Ristau et al.

(10) Patent No.: US 7,596,465 B2
(45) Date of Patent: Sep. 29, 2009

(54) SYSTEM AND METHOD FOR BUILT-IN TESTING OF A GPS RECEIVER

(75) Inventors: Randall Dale Ristau, San Jose, CA (US); Paul Turney, Woburn, MA (US)

(73) Assignee: Trimble Navigation Limited, Sunnyvale, CA (US)

( * ) Notice: Subject to any disclaimer, the term of this patent is extended or adjusted under 35 U.S.C. 154(b) by 1192 days.

(21) Appl. No.: 10/672,354

(22) Filed: Sep. 25, 2003

(65) Prior Publication Data

US 2006/0005087 A1    Jan. 5, 2006

(51) Int. Cl.
*G06F 19/00* (2006.01)
(52) U.S. Cl. ........................................ 702/116; 701/213
(58) Field of Classification Search ................ 455/423, 455/425, 426.1, 67.11, 67.14, 226.1, 280; 701/213, 214; 342/357.06, 357.12; 702/116–126
See application file for complete search history.

(56) References Cited

U.S. PATENT DOCUMENTS

| 5,726,893 | A | | 3/1998 | Schuchman et al. |
| 5,922,041 | A | * | 7/1999 | Anderson ................ 701/200 |
| 5,949,372 | A | | 9/1999 | Lennen et al. |
| 6,114,989 | A | * | 9/2000 | Fontes et al. ........... 342/357.06 |
| 6,127,970 | A | | 10/2000 | Lin et al. |
| 6,466,846 | B2 | * | 10/2002 | Maynard ................... 701/13 |
| 6,639,541 | B1 | | 10/2003 | Quintana et al. |
| 6,760,582 | B2 | * | 7/2004 | Gaal ......................... 455/423 |
| 6,782,330 | B1 | * | 8/2004 | Clark ......................... 702/66 |
| 2002/0015439 | A1 | | 2/2002 | Kohli et al. |
| 2004/0093135 | A1 | * | 5/2004 | Kang et al. ................... 701/29 |

* cited by examiner

*Primary Examiner*—Patrick Assouad
*Assistant Examiner*—Craig Steven Miller

(57) ABSTRACT

Built-in test equipment (BITE) incorporated in a GPS receiver for providing a loop forward test. The loop forward test capability may be combined with a loop backward capability to provide a comprehensive built-in test (BIT) capability for the signal path in a GPS receiver. A code generator generates deterministic test code signals such as C/A code, P code and pseudo M code that are used to modulate one or more radio frequency (RF) carriers to produce RF test signals. The RF test signals are injected into the GPS receiver's RF input. The RF test signal signals are then down-converted and demodulated through an operational signal path of the GPS receiver. The processed test signals may then be compared to the initial test data. A loop backward BITE may also be used to sample the positioning data output by the receiver.

18 Claims, 5 Drawing Sheets

SYSTEM AND METHOD FOR BUILT-IN TESTING OF A GPS RECEIVER

FIELD OF THE INVENTION

The present claimed invention relates to the field of global positioning system (GPS) instruments. More particularly, the present claimed invention relates to built-in testing of GPS instruments.

BACKGROUND ART

In civil aircraft operations where system safety is a paramount concern, it important that GPS receivers not be allowed to operate in a defective fashion that outputs potentially hazardous and misleading information (HMI) to a pilot. Thus, the probability of a GPS receiver outputting such information is typically specified (e.g., less than $10^{-5}$ per flight hour) by regulations governing civil aviation.

The Federal Aviation Administration (FAA) has developed certification procedures for GPS airborne receivers using the Standard Positioning Service (SPS) for Instrument Flight Rules (IFR) operation in the National Airspace System (NAS), embodied in Technical Standard Orders (TSOs) C129a, C145, and C146. The certification of a GPS airborne receiver depends in part on its built-in test (BIT) capability.

As GPS receivers become more complex, the difficulty in achieving sufficient test coverage increases. For example, military GPS receivers may have Selective Availability/Anti-Spoof Module (SAASM) capability, or M-Code processing capability.

SAASM and M-code technologies require additional components for signal processing and computation that may be employed in either the analog or digital portions of the signal path of a GPS receiver, and must be accounted for in a system providing a complete built. However, the ability to provide built-in testing of these technologies is lacking in the prior art.

Thus a need exists for a system and method for testing a GPS receiver that provides an improved BIT capability. There is also a need for system and method that provides a BIT capability for both the analog and digital portions of the signal path in a GPS receiver.

SUMMARY OF INVENTION

Accordingly, the present invention provides a system and method for built-in testing of a global positioning system (GPS) receiver. Embodiments of the present invention provide a loop forward capability and a loop backward capability that in combination provide a comprehensive BIT capability for both the analog and digital portions of the signal path in a GPS receiver.

In one embodiment built-in test equipment (BITE) incorporated in a GPS receiver performs a loop forward test that generates deterministic GPS test data which are used to modulate one or more RF carriers to produce RF test signals. The RF test signals are applied to the GPS receiver's radio frequency (RF) front end. These signals are then processed through an operational signal path of the GPS receiver and compared to the initial test data.

In another embodiment, a loop backward BITE is used by a system processor in a GPS receiver to sample the positioning data and output by the GPS receiver. The microprocessor also controls a loop forward BITE, thus providing comprehensive testing of the signal path within the GPS receiver.

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances well known methods, procedures, components, and circuits have not been described in detail as not to unnecessarily obscure aspects of the present invention.

Figure 1:
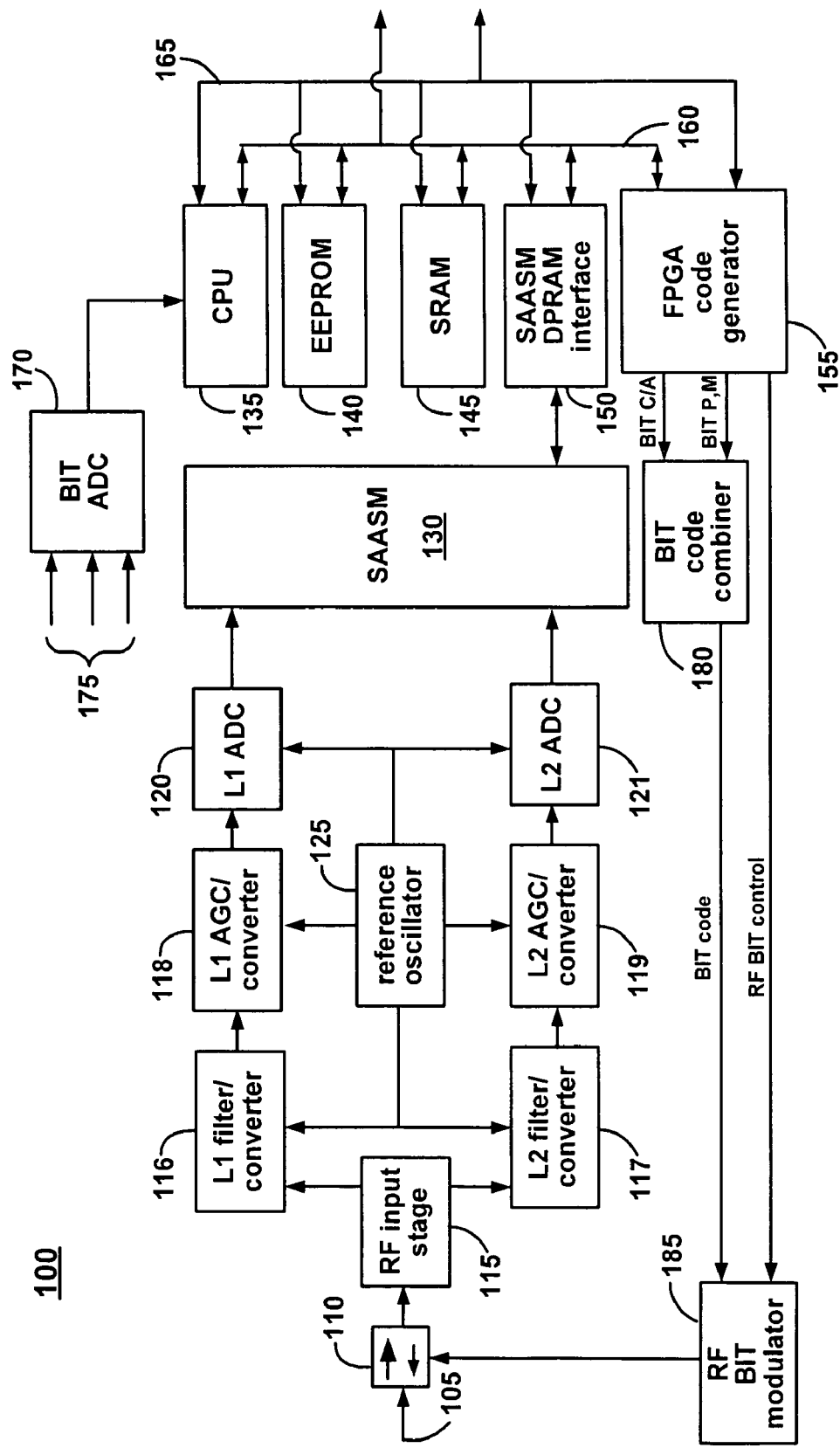
FIG. 1 shows a circuit block diagram for a portion of a GPS receiver including RF analog circuitry, a Selective Availability/Anti-Spoof Module (SAASM), and loop forward built-in test equipment (BITE) in accordance with an embodiment of the present claimed invention.

FIG. 1 shows a circuit block diagram for a portion of a GPS receiver 100 including a Selective Availability/Anti-Spoof Module (SAASM) 130, and loop forward built-in test equipment (BITE) in accordance with an embodiment of the present invention.

An RF input stage 115 accepts radio frequency (RF) GPS signals from an antenna (not shown). The RF input stage 115 includes a diplexer for separating the L1 (1575.42 MHz) and L2 (1227.6 MHz) signals, and may also provide gain for the L1 and L2 signals. A filter/converter 116 provides filtering and downconversion of the L1 signal and an AGC/converter 118 provides automatic gain control and further downconversion of the L1 signal to an intermediate frequency (IF). The filter/converter 117 and AGC/converter 119 perform similar functions for the L2 signal, as described for the L1 signal.

The IF signals derived from L1 AGC/converter 118 and the L2 AGC/converter 119 are input to an L1 analog-to-digital converter (ADC) 120 and an ADC 121, respectively. L1 ADC 120 and L2 ADC 121 each produce an IF digital signal. A reference oscillator 125 is used to provide the reference frequencies for converters 116, 117, 118, 119, and is also used to provide the clock signal for L1 ADC 120 and L2 ADC 121. The reference oscillator may also be used to generate reference signals for the RF BIT modulator 185, as well as clock signals for digital circuits such as the code generator 155.

The digital IF signals from the L1 ADC 120 and the L2 ADC 121 are input to the SAASM module 130. The SAASM module 130 provides among other functions, the capability to directly acquire P(Y) Code, enabling a GPS receiver to use the Precise Positioning Service (PPS) without requiring the coarse acquisition (C/A) code.

Traditionally, the PPS has relied on the use of the C/A code in order to obtain access to the P(Y) Code information. For national security purposes selective availability (SA) can be used to degrade the C/A code signal without affecting the PPS. However, the degradation of the C/A code signal using SA is global in extent and cannot be applied locally.

In the year 2000 SA was turned off, and the increased accuracy available further encouraged civilian adoption of GPS. Although SA could be turned on again if needed, the global impact could unnecessarily affect civilian use. As an alternative to SA, local denial of the C/A code has been introduced as a method of restricting GPS availability to authorized users in a particular region. Since local denial of the C/A code affects all users in a region, authorized users must have the capability to directly acquire the P(Y) code.

Until recently a very accurate clock was required for direct acquisition of the P(Y) code signal. However, advances in signal processing and integrated circuits has made P(Y) code signal acquisition achievable through intensive calculations without requiring an accurate time. The SAASM 130 provides the signal processing and computational capability required for direct acquisition of the P(Y) code signal. The SAASM also includes a key data processor for handling cryptographic data processing of the acquired P(Y) code signal.

The SAASM 130 is coupled to a dual-port random access memory (DPRAM) interface 150 that is in turn coupled to system data bus 160 and an address/control bus 165. The data bus 160 and address/control bus are also coupled to a static random access memory (SRAM) 145, an electrically-erasable programmable read-only memory (EEPROM) 140, a system central processing unit (CPU) 135, and a code generator 155.

The CPU 135 computes position, velocity and time based upon the raw data received from the SAASM 130. The CPU also provides provide overall control of the monitoring and BIT capability of the GPS receiver. A BIT ADC 170 provides data derived from system DC power sources to the CPU 135. Examples of DC levels 175 that may be monitored by the ADC 170 are antenna preamplifier current and voltage, battery voltage, primary power supply voltage, and internal supply voltage ($V_{cc}$) for on-board devices.

The SAASM module 130 adds considerable complexity to a GPS receiver, and thus increases the both the potential for failure and the need for expanded test coverage.

The code generator 155 provides the digital test data used for testing data processing functions within the GPS receiver. The code generator 155 may be implemented as a field programmable gate array (FPGA), application specific integrated circuit (ASIC), or other integrated circuit. In a system including a sufficiently powerful CPU 135 and available memory for storing instructions, the code generator may be implemented by the CPU 135.

The code generator produces test data sequences for both the C/A code and P code. The test sequences are preferably known, deterministic test patterns that can subsequently be compared to a test output to verify system operation. In other embodiments, the code generator 155 may produce a pseudo M code test sequence that is representative of the broadcast M code signal.

The pseudo M code signal uses the L1 and L2 bands, and can be used in conjunction with the C/A code and Y code signals. The pseudo M code signal uses different keying architecture and modulation than the current Y code, and is expected to provide greater flexibility and better performance for military users.

In general, the code generator 155 generates one or more sequences of bits that emulate a set or subset of data in accordance with one or more GPS data message formats. These test sequences (e.g., P code and C/A code) are combined by a bit code combiner 180 and passed to a RF BIT modulator 185.

The RF BIT modulator produces one or more RF signals that contain the combined test bit sequences and is modulated using the appropriate scheme. For example, an L1 carrier may be modulated to transmit the P code and/or C/A code and an L2 carrier may be modulated to transmit the P code and/or C/A code.

In general, The RF BIT modulator 185 generates one or more RF carrier signals and modulates the carrier signals using the test bit sequences provided by the BIT code combiner 180 to produce BIT RF test signals. The RF BIT modulator may modulate carriers at two different frequencies with the same information, or may modulate two distinct carriers at the same frequency using different bit sequences (e.g., pseudo M code).

The BIT RF signal output from the RF BIT modulator 185 and an antenna input 105 are coupled to the RF input stage 15 by a directional coupler 110. The directional coupler 110 minimizes the amount of test signal energy leaked to the antenna, an maximizes the energy input to the RF input stage 115. Alternatively, a switch may be used to select between the antenna input 105 and the RF BIT modulator 185.

Three types of BIT may be performed by the GPS receiver. Power-up BIT is conducted when the receiver is first turned on, prior to normal operation. Initiated BIT is performed on demand, and may be performed at any time during normal operation. For power-up BIT and initiated BIT the antenna input may be switched off. Continuous BIT may be performed periodically during normal operation of the GPS receiver. Under continuous BIT, it is desirable that the test signal is not confused with a real signal if continuous testing is performed without switching out the antenna.

In one embodiment, the test signal is distinguished from the real signals by shifting the test signal frequency outside of the expected range of the real signals. In another embodiment the test signal uses a pseudo random noise (PRN) code that is not used by real signal sources. For example, PRN 32 is not used by GPS satellites and may be dedicated to the test signal. The PRN of an operational satellite may be used for a test signal when the satellite is known to be sufficiently below the horizon, so that a real signal cannot be received from the satellite.

For power-on test and initiated test as many as all available receiver channels (e.g., twelve) may be tested since normal operation is suspended. The ability to provide the same signal level to each channel provides a channel comparison that cannot be made when using multiple transmitted sources.

The injection of synthesized L1 and L2 signals from the RF BIT modulator 185 also provides the capability for measurement of and correction for system delay differences between the L1 and L2 signal paths within the GPS receiver. The use of a master clock within the receiver provides precise synchronization between the test signal generator and the receiver channels.

Figure 2:
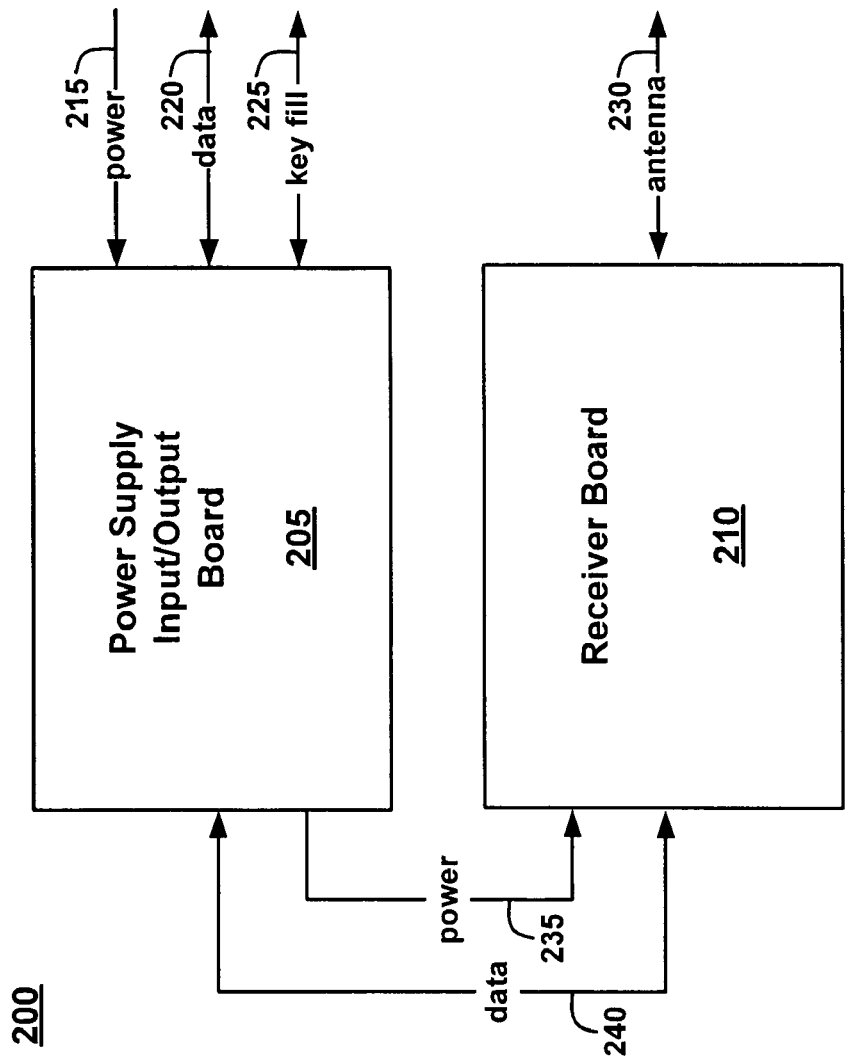
FIG. 2 shows a modular diagram for a GPS receiver in accordance with an embodiment of the present claimed invention.

FIG. 2 shows a modular diagram 200 for a GPS receiver in accordance with an embodiment of the present invention. A power supply/input/output (PSIO) board 205 has an input 215 for system power, a bidirectional data port 220, and a key fill port 225.

The power input 215 provides basic electrical power for the GPS receiver that is conditioned by the PSIO board 205 to provide power for the circuits of the PSIO board 205 and the receiver board 210.

The data port 220 provides external communication for the GPS receiver. For example, the data port 220 may be coupled to a flight management system (FMS). The PSIO board typically provides formatting and/or buffering for the data transmitted and received from the data port 220.

The optional key fill port 225 provides for loading of cryptographic key data. For receivers with a SAASM capability or other restricted technology, one or more keys may be required for enablement and access.

Power 235 is provided to the receiver board 210 over one or more cables. Similarly, data 240 is passed between the receiver board and PSIO board using one or more data cables. The receiver board 230 includes an antenna input 230 for accepting an RF input signal.

Figure 3:
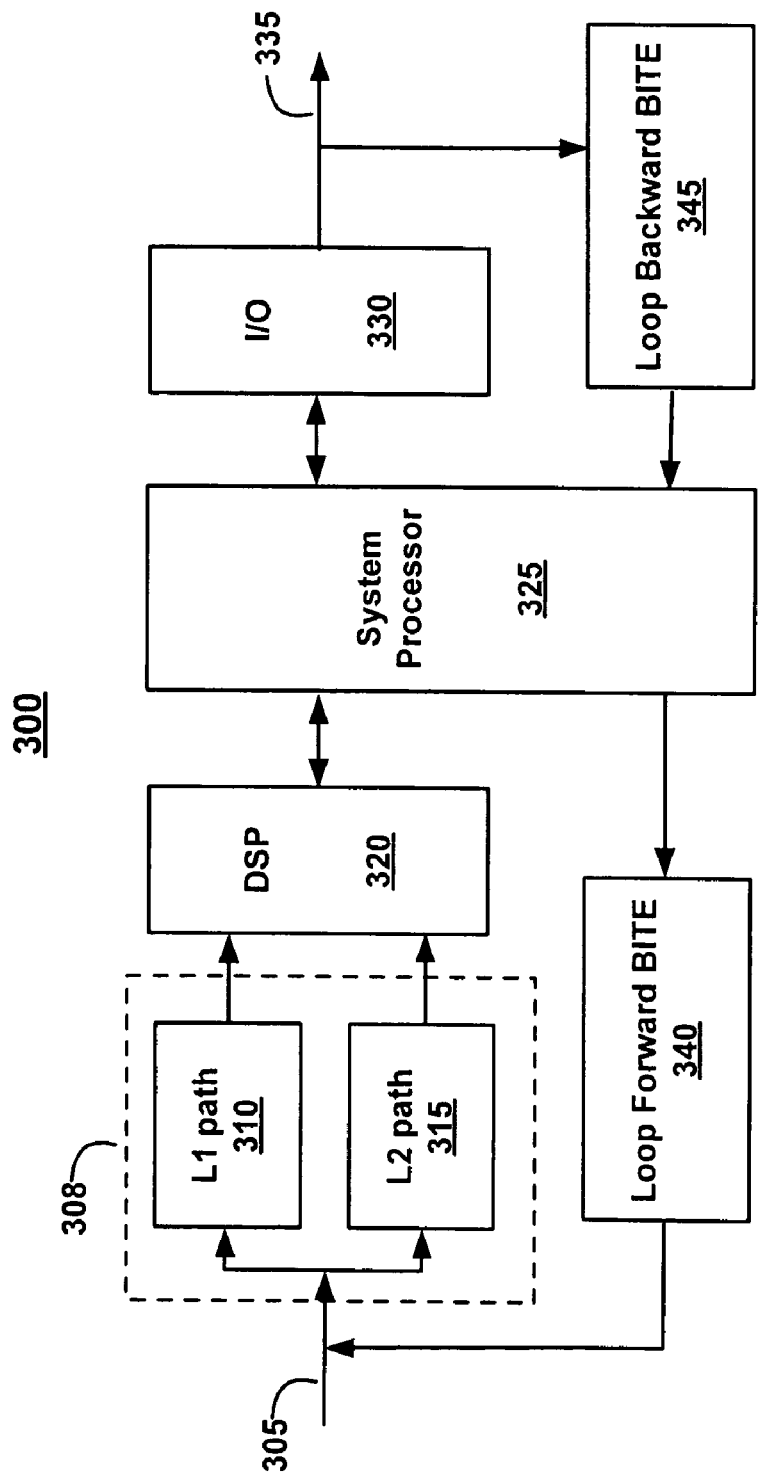
FIG. 3 shows a block diagram for data flow in a GPS receiver including loop forward BITE and loop backward BITE in accordance with an embodiment of the present claimed invention.

FIG. 3 shows a block diagram 300 for data flow in a GPS receiver including loop forward BITE and loop backward BITE in accordance with an embodiment of the present invention. The overall data flow occurs between an RF antenna input 305 and a positioning data output 335.

A system processor 325 provides a nexus that joins two halves of the operational signal path of the GPS receiver. The system processor 325 is coupled to loop forward BITE 340 and to loop backward BITE 345. The combination of the system processor 325, loop forward BITE 340, and the loop backward BITE 345 provides test coverage for the GPS receiver from input to output.

Under control of the system processor 325, the loop forward BITE 340 generates an RF signal that is coupled to the RF input 305 of the GPS receiver. The RF input 305 is coupled to an analog processing block 308. In this example the analog processing block 308 includes an L1 path 310 and an L2 path 315. In general, the analog processing block 308 provides functions such as gain, attenuation, filtering, frequency conversion, and analog-to-digital conversion. The output of the analog processing block 308 is typically a digital IF signal.

The analog processing block 308 is coupled to a digital signal processor (DSP) 320. The DSP 320 receives the digital IF signal that typically includes information from multiple sources (e.g., multiple satellites). The DSP 320 provides signal separation, correlation, and produce raw data that may be used by the system processor 325. The DSP 320 may also provide cryptographic functionality.

The system processor 325 uses the raw data from the DSP 320 and optional correction data to produce position, time, and velocity information. This information is typically formatted as a digital data message according to a standard protocol.

The message from the system processor 325 is passed to an I/O block 330. The I/O block 330 provides an external communications interface and manages the flow of data into and out of the GPS receiver. The data message may be formatted according one or more communications protocols and is output at a data port 335.

The loop forward BITE 340 accepts test data from the system processor 325 and converts the data to one or more RF signals that are input to the analog processing block 308. The test data provided by the system processor may be emulate a satellite data message, or it may be a predetermined sequence of bits that does not correspond to a satellite signal.

The test data message may be specific to a specific channel, or it may applied identically to multiple channels. A single signal applied to one or more channels identically provides identical input levels between channels. This circumstance is seldom observable during normal operation, and provides the ability to evaluate the relative performance between channels. In general, a group of test signals may be provided to the receiver front end with each receiver channel being able to independently track a desired test signal.

The deterministic nature of the test data allows to system processor 325 to evaluate the impact of both the analog processing block 308 and the DSP 320 on data integrity.

The loop backward BITE 345 is coupled to the output data port 335 and allows the system processor 325 to sample the output data and compare it to the data that was input to the I/O block 330. The loop backward is distinguished from the loop forward in that the system processor is inherently aware of the signal being input to the I/O block 330. Thus, a specific test data message may or may not be used in the loop backward test.

Individually and in combination, the loop forward BITE 340 and loop backward BITE 345 provide an increased capability to detect malfunctions in a GPS receiver through BIT. This increased capability is particularly useful in applications were two or more GPS receivers are used in a redundant configuration for backup.

Although the addition of BITE circuitry slightly increases the probability of component failure in the receiver to which it is being added, it significantly improves ability to detect a failure, and appropriately make use of the backup capability that is available in a redundant system.

Figure 4A:
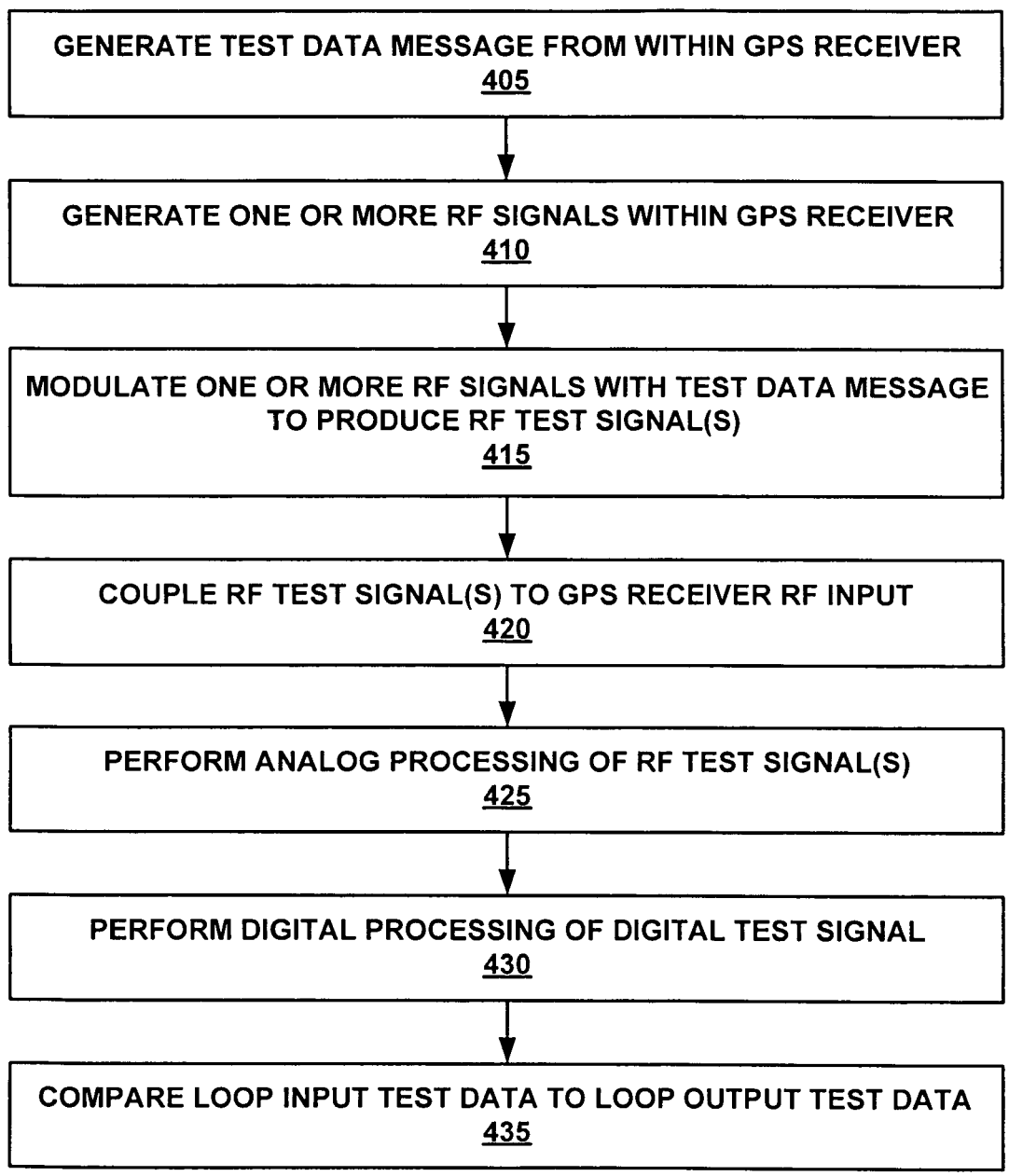
FIG. 4A shows a flow diagram for a method of performing loop forward built-in testing of a GPS receiver accordance with an embodiment of the present claimed invention.

FIG. 4A shows a flow diagram 400 for a loop forward portion of a method of performing built-in testing of a GPS receiver accordance with an embodiment of the present invention. Reference will be made to the GPS receiver front end shown in FIG. 1 and data flow of FIG. 3; however, the method is not limited to practice with the architectures shown.

At step 405, a test data message is provided. The test data message may be generated by a code generator (e.g., FPGA) under the control of a system processor within the GPS receiver. The test data message may emulate C/A code, P code, pseudo M code, or other GPS signal.

At step 410, one or more RF carrier signals are generated. For example, an L1 carrier and an L2 carrier may be generated. Two distinct carrier signals may be generated at a single frequency, or they may generated at different frequencies.

At step 415, one or more of the carrier signals generated in step 410 are modulated using the test data message of step 405 to produce an RF test signal. The test signal may be a combination signals carrying different codes (e.g., C/A code, P code, pseudo M code).

At step 420, the RF test signal(s) are coupled to the RF input of the GPS receiver. The signal(s) may be coupled by a switch or a directional coupler.

At step 425, analog processing of the RF test signal(s) is performed. filtering, frequency conversion, gain, attenuation and analog-to-digital conversion may be performed on the RF test signal(s).

At step 430, digital processing of the test signal is performed. Channel separation, correlation and cryptographic functions may be performed during digital processing.

At step 435, the digitally processed signal is compared to the input test data message. A deviation from the expected result indicates an error in either the operational signal chain or the BITE circuits, and a warning may be issued as to the possibility of hazardous and misleading information (HMI). Steps 405 through 435 provide a loop forward BIT that can be performed by a system processor and BITE circuits such as those shown in FIG. 1.

Figure 4B:
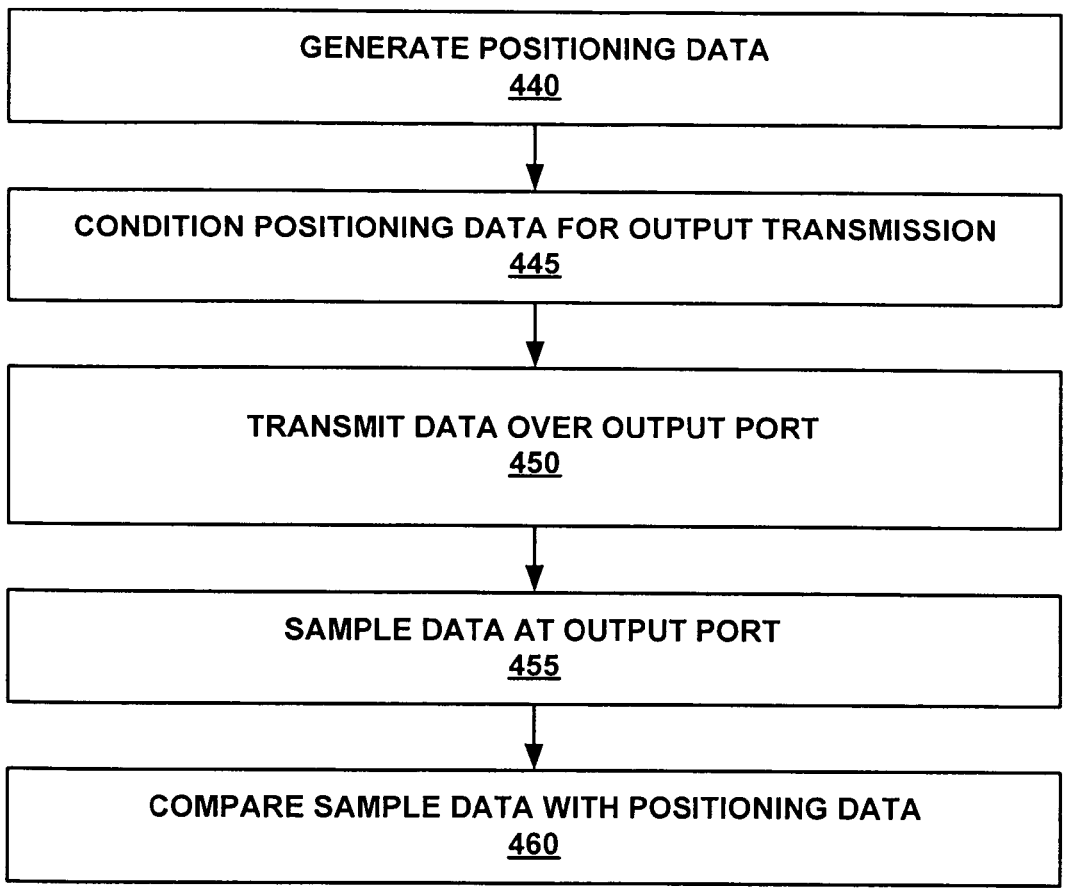
FIG. 4B shows a flow diagram for a method of performing loop backward built-in testing of a GPS receiver accordance with an embodiment of the present claimed invention.

FIG. 4B shows a loop backward method 402 of performing built-in testing of a GPS receiver accordance with an embodiment of the present invention. At step 440 positioning data is provided. This may be operational data obtained during normal operation of the GPS receiver, or it may be data specifically generated for test purposes by a system processor.

At step 445, the positioning data is formatted for output transmission (e.g., by I/O block 330 of FIG. 3). The output format may be for a specific system such as a flight management system (FMS) or it may be for a general network or bus protocol.

At step 450, the data is transmitted over the output data port (e.g., 335 of FIG. 3). At step 455, the output data is sampled. The sampling of the output data may be performed during normal operation, without interruption, or it may be performed during suspended operation using specific test data.

At step 460 the sampled data is compared to the original data. A discrepancy between the sampled data and the original data indicates an error in the normal signal path or the BITE. In either case, and a warning may be issued as to the possibility of hazardous and misleading information (HMI) being output by the GPS receiver.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the Claims appended hereto and their equivalents.

What is claimed is:

1. A system for built-in test for a GPS receiver comprising:
   a system processor;
   a radio frequency (RF) input coupled to said system processor by a first operational signal path; and
   a loop forward built-in test equipment (BITE) coupled to said system processor and to said RF input for providing an RF test signal to said RF input;
   a data output port coupled to said system processor by a second operational signal path; and
   a loop backward built-in test equipment (BITE) coupled to said system processor and to said data output port for providing sampled output data to said system processor.

2. The system of claim 1, wherein said operational signal path comprises an L1 signal path and an L2 signal path.

3. The system of claim 1, wherein said loop forward BITE comprises a code generator for generating a test bit sequence that emulates a set or subset of data in accordance with a GPS data message format.

4. The system of claim 1, wherein said RF test signal is modulated using a code selected from the group consisting of pseudo M code, P code, and C/A code.

5. The system of claim 1, wherein said first operational signal path comprises a Selective Availability/Anti-Spoof Module (SAASM).

6. The system of claim 1, wherein said loop forward BITE is coupled to said RF input by a directional coupler.

7. A GPS receiver comprising:
   an antenna input;
   an analog processing block coupled to said antenna input;
   a digital signal processor (DSP) coupled to said analog processing block;
   a system processor coupled to said DSP;
   a loop forward built-in test equipment (BITE) coupled to said system processor and to said analog processing block for providing an RF test signal to said analog processing block; and
   a loop backward built-in test equipment (BITE) coupled to said system processor and to a data output port for providing sampled output data to said system processor.

8. The system of claim 7, wherein said antenna input and said loop forward BITE are coupled to said analog processing block by a switch for selecting a signal from said antenna input or a signal from said loop forward BITE.

9. The system of claim 7, wherein said loop forward BITE is coupled to said antenna input and said loop forward BITE are coupled to said analog processing block by a directional coupler.

10. The system of claim 7, wherein said loop forward BITE comprises a code generator.

11. The system of claim 10, wherein said code generator is a field programmable gate array (FPGA).

12. The system of claim 10, further comprising an RF modulator for generating an RF carrier and modulating said carrier with a code generated by said code generator.

13. A method for performing built-in test (BIT) of a GPS receiver comprising:
   generating a test data message within said GPS receiver;
   generating a first RF carrier within said GPS receiver;
   modulating said first RF carrier with said test data message to produce a first RF test signal;
   coupling said first RF test signal to an RF input of said GPS receiver;
   providing positioning data to an input/output (I/O) block for formatting;
   transmitting the positioning data over an output data port;
   sampling the transmitted positioning data at said output data port; and
   comparing the transmitted data to the positioning data provided to the I/O block.

14. The method of claim 13, further comprising: generating a second RF carrier within said GPS receiver;
   modulating said second RF carrier with said test data message to produce a second RF test signal; and
   coupling said second RF test signal to said RF input of said GPS receiver.

15. The method of claim 14, wherein said first RF carrier and said second RF carrier have the same frequency.

16. The method of claim 15, wherein said first RF carrier has a frequency that is different from the frequency of said second RF carrier.

17. The method of claim 13, wherein said positioning data is derived from a signal input to said RF input.

18. The method of claim 13, wherein said positioning data is specifically generated for test purposes by a system processor.

* * * * *